(12) United States Patent
Banik et al.

(10) Patent No.: US 11,989,563 B2
(45) Date of Patent: May 21, 2024

(54) DYNAMIC BIOS POLICY FOR HYBRID GRAPHICS PLATFORMS

(71) Applicant: Intel Corporation, Santa Clara, CA (US)

(72) Inventors: Subrata Banik, Bangalore (IN); Rajaram Regupathy, Bangalore (IN); Kalyan Kondapally, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 654 days.

(21) Appl. No.: 17/111,989

(22) Filed: Dec. 4, 2020

(65) Prior Publication Data

US 2021/0089326 A1    Mar. 25, 2021

(51) Int. Cl.
| | | |
|---|---|---|
| *G06F 9/4401* | (2018.01) | |
| *G06F 1/26* | (2006.01) | |
| *G06F 1/3212* | (2019.01) | |
| *G06F 9/451* | (2018.01) | |
| *G06F 11/30* | (2006.01) | |
| *G06F 15/78* | (2006.01) | |

(52) U.S. Cl.
CPC .......... *G06F 9/4406* (2013.01); *G06F 1/3212* (2013.01); *G06F 9/4403* (2013.01); *G06F 9/451* (2018.02); *G06F 11/3013* (2013.01); *G06F 11/3062* (2013.01); *G06F 15/7807* (2013.01)

(58) Field of Classification Search
CPC ...... G06F 9/4406; G06F 9/451; G06F 1/3212; G06F 9/4403; G06F 11/3013; G06F 11/3062; G06F 15/7807
See application file for complete search history.

(56) References Cited

U.S. PATENT DOCUMENTS

| | | | | |
|---|---|---|---|---|
| 8,325,193 | B1* | 12/2012 | Wyatt | G06T 15/005 345/519 |
| 8,717,371 | B1* | 5/2014 | Wyatt | G06F 1/3287 713/320 |
| 10,224,003 | B1* | 3/2019 | Akiyama | G06F 3/14 |
| 2018/0095740 | A1* | 4/2018 | Kotary | G06F 9/4401 |
| 2021/0034452 | A1* | 2/2021 | Tan | G06F 9/4403 |
| 2021/0232688 | A1* | 7/2021 | Luciani | G06F 21/57 |
| 2021/0382539 | A1* | 12/2021 | Suryanarayana | G06F 8/65 |

* cited by examiner

*Primary Examiner* — Jaweed A Abbaszadeh
*Assistant Examiner* — Gayathri Sampath
(74) *Attorney, Agent, or Firm* — Jordan IP Law, LLC

(57) ABSTRACT

Systems, apparatuses and methods may provide for technology that detects a low battery condition in a computing system including an integrated graphics processor and a discrete graphics processor, wherein the low battery condition is detected during a pre-boot stage of the computing system. The technology may also disable a root port associated with the discrete graphics processor in response to the low battery condition, conduct an initialization of an integrated display while the root port is disabled, and enable the root port in response to a successful negotiation of increased power by a verified read write code of an embedded controller of the computing system.

25 Claims, 7 Drawing Sheets

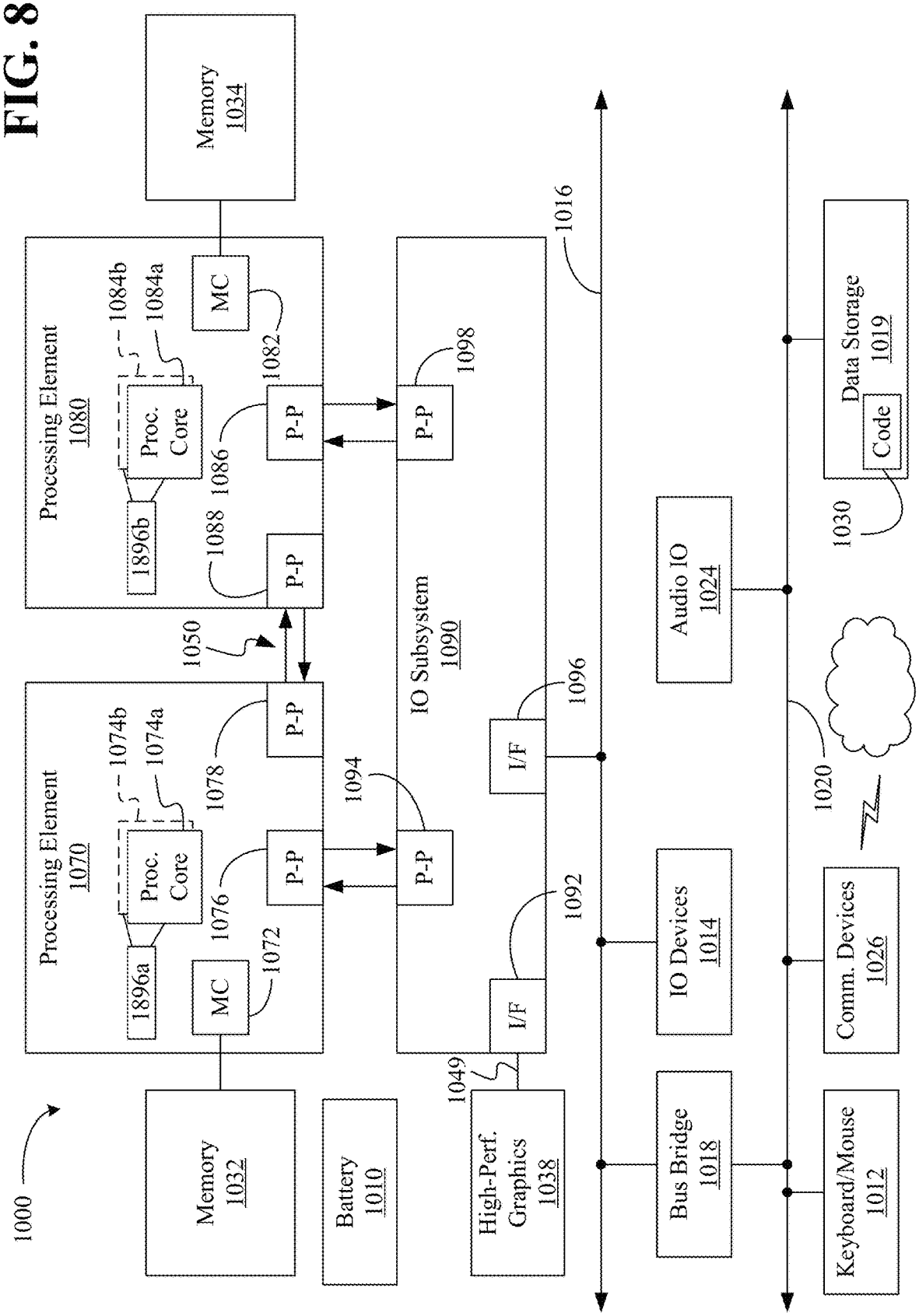

DYNAMIC BIOS POLICY FOR HYBRID GRAPHICS PLATFORMS

TECHNICAL FIELD

Embodiments generally relate to hybrid graphics platforms. More particularly, embodiments relate to a dynamic basic input output system (BIOS) policy for hybrid graphics platforms.

BACKGROUND

Hybrid graphics computing platforms may include a discrete graphics device in addition to an integrated graphics device, where the discrete graphics device supports high performance output, but with greater power consumption. Upon startup of a hybrid graphics computing platform, a static BIOS policy may initialize the discrete graphics device regardless of the state of the platform. If the platform is in a low battery state, high power demands associated with initializing the discrete graphics device may cause the platform to hang or reboot. This performance challenge may in turn have a negative impact on the user experience.

BRIEF DESCRIPTION OF THE DRAWINGS

The various advantages of the embodiments will become apparent to one skilled in the art by reading the following specification and appended claims, and by referencing the following drawings, in which:

FIG. 8 is a block diagram of an example of a multi-processor based computing system according to an embodiment.

DESCRIPTION OF EMBODIMENTS

Figure 1:
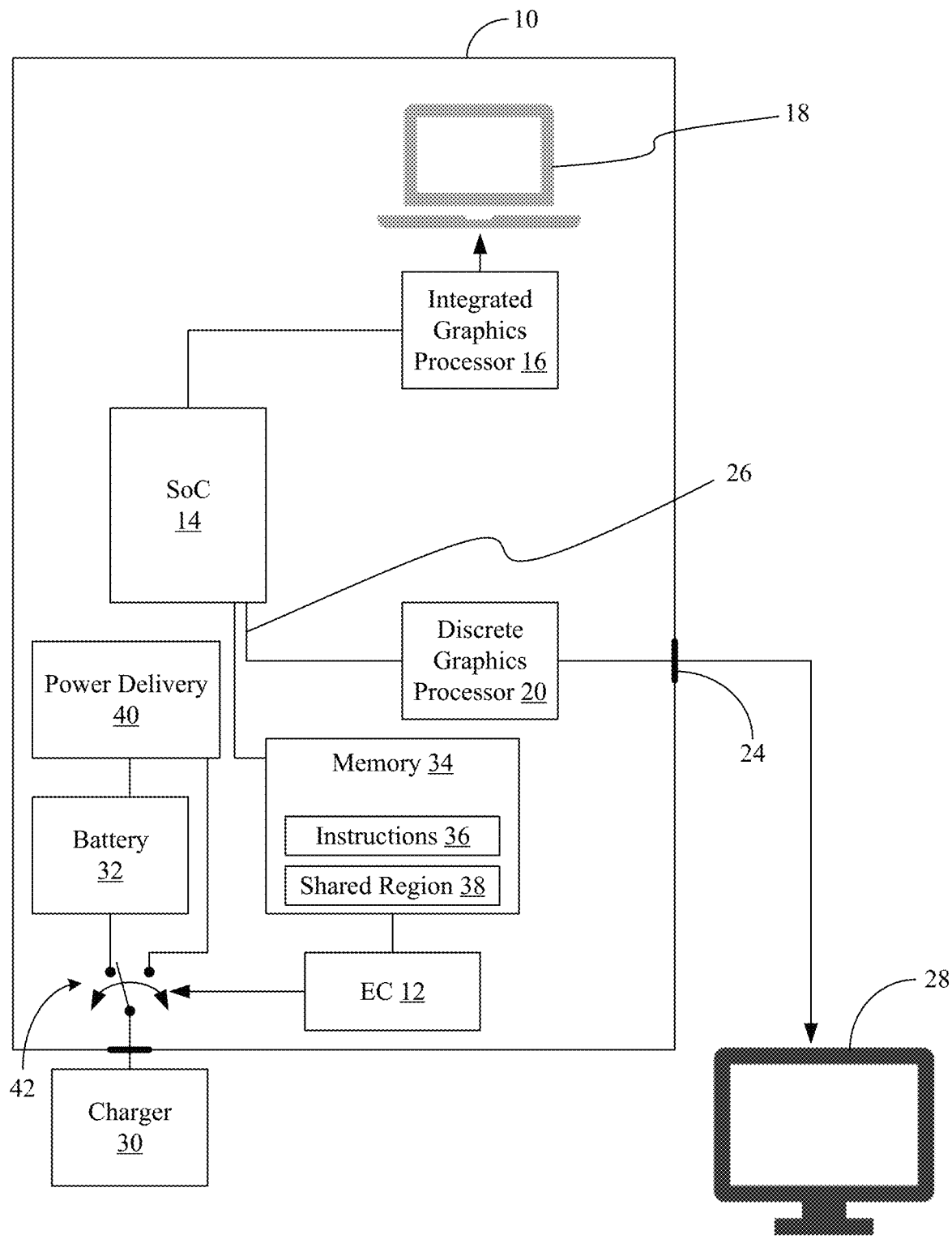
FIG. 1 is a block diagram of an example of a performance-enhanced computing system according to an embodiment.

Turning now to FIG. 1, a performance-enhanced computing platform/system 10 is shown. The illustrated computing system 10 includes a memory 34, an embedded controller (EC) 12, a system on chip (SoC) 14, an integrated graphics processor 16 (e.g., including a graphics engine and a display controller), an integrated display 18 coupled to the integrated graphics processor 16, a discrete graphics processor 20 (e.g., including a graphics engine and a display controller), and a root port 24 (e.g., PCIE/Peripheral Component Interconnect Express root port) coupled to the discrete graphics processor 20. The discrete graphics processor 20 may be coupled to the SoC 14 via an interface 26 such as an add-in-card (AIC) slot (e.g., PCIE slot), a cable/port (e.g., Thunderbolt cable), a motherboard connection (e.g., motherboard-down solution), and so forth. Although the connections are not shown, the discrete graphics processor 20 may be used to render and/or stream out pixels to the integrated display 18 in addition to an external display 28. Thus, based on user workloads or activity, the SoC 14 may switch between the discrete graphics processor 20 and the integrated graphics processor 16 to achieve higher performance, increase productivity, optimize power consumption, and so forth. In an embodiment, the discrete graphics processor 20 supports a relatively high performance (e.g., 1080P three-dimensional/3D gaming) output as shown in Table I below.

TABLE I

| Segment | Discrete Graphics Power (Watts) | SoC Power (Watts) | Graphics Performance Score |
|---|---|---|---|
| High-End– | 100 | 15 | 90K |
| Mid-Range+ | 65-80 | 15 | 60K |
| Mid-Range– | 35-50 | 15 | 30K |
| Entry | 10-25 | 15 | 15K |

Upon startup of the computing system 10, a charger 30 may deliver a limited amount of power (e.g., 15 Watts) to the computing system 10. As shown in Table I, however, the power demands of the SoC 14 and the discrete graphics processor 20 may substantially exceed the amount of power delivered by the charger 30. Although recent developments in USB (Universal Serial Bus, e.g., USB TYPE-C/USB-C Port Controller Interface Specification, Ref 2.0, Ver. 1.1, March 2020, USB 3.0 Promoter Group) technology may permit the EC 12 to negotiate with the charger 30 for a higher level of power from the charger 30, the high-power negotiation may typically take place only after it has been verified that read write (RW) code in the EC 12 is uncorrupted. If a battery 32 of the computing system 10 is either dead or substantially depleted (e.g., a low battery condition), initializing the discrete graphics processor 20 during a pre-boot stage of the computing system 10 may cause the computing system 10 to hang or reboot. In an embodiment, a pre-boot stage is an execution stage that occurs before an operating system (OS) has been loaded.

Accordingly, the illustrated memory 34 includes a set of executable program instructions 36, which when executed by the SoC 14 (e.g., including a host processor, input/output module, etc.), causes the SoC 14 and/or computing system 10 to detect the low battery condition in the computing system 10 during the pre-boot stage of the computing system 10, disable the root port 24 in response to the low battery condition, conduct an initialization of the integrated display 18 while the root port 24 is disabled, and enable the root port 24 in response to a successful negotiation of increased power (e.g., 100 Watts) by verified RW code of the EC 12. Moreover, execution of the instructions 36 may also cause the SoC 14 and/or the computing system 10 to bypass an initialization of the external display 28 while the root port 24 is disabled. In an embodiment, execution of the instructions 36 also causes the SoC 14 and/or the computing system 10 to conduct the initialization of the external display 28 after increased power is available from the charger 30 and the root port 24 is enabled. Additionally, execution of the instructions 36 may cause the SoC 14 and/or the computing system 10 to increase the charging rate of the computing system 10 in response to the successful negotiation of increased power.

Selectively initializing the integrated display 18 rather than the external display 28 until the RW code of the EC 12 has been verified and the increased power has been negotiated enables the computing system 10 to avoid performance concerns such as a hang or reboot due to insufficient power being available from the charger 30 and/or battery 32. Indeed, faster charging may be achieved and the user experience may also be improved.

The initialization of the external display 28 may be conducted based on a video basic input output system (BIOS) table (VBT, not shown) that is copied into the memory 34 for consumption by an OS executing on the SoC 14. The VBT may also be copied into an Advanced Configuration and Power Interface (ACPI) graphics operating region (not shown) for consumption by a graphics driver. In one example, the VBT includes original equipment manufacturer (OEM) configuration data that is specific to the external display 28 and facilitates a better visual experience.

In an embodiment, execution of the instructions 36 further causes the SoC 14 and/or the computing system 10 to set a critical battery flag in response to the low battery condition, where the critical battery flag is set in a memory region 38 that is shared by the EC 12 and the BIOS of the computing system 10. The critical battery flag may trigger a supply of power from the charger 30 directly to the SoC 14 via a power delivery (PD) system 40. For example, the critical battery flag might cause the EC 12 to control a switch 42 so that the supply of power bypasses the battery 32 while the root port 24 is disabled.

Figure 2:
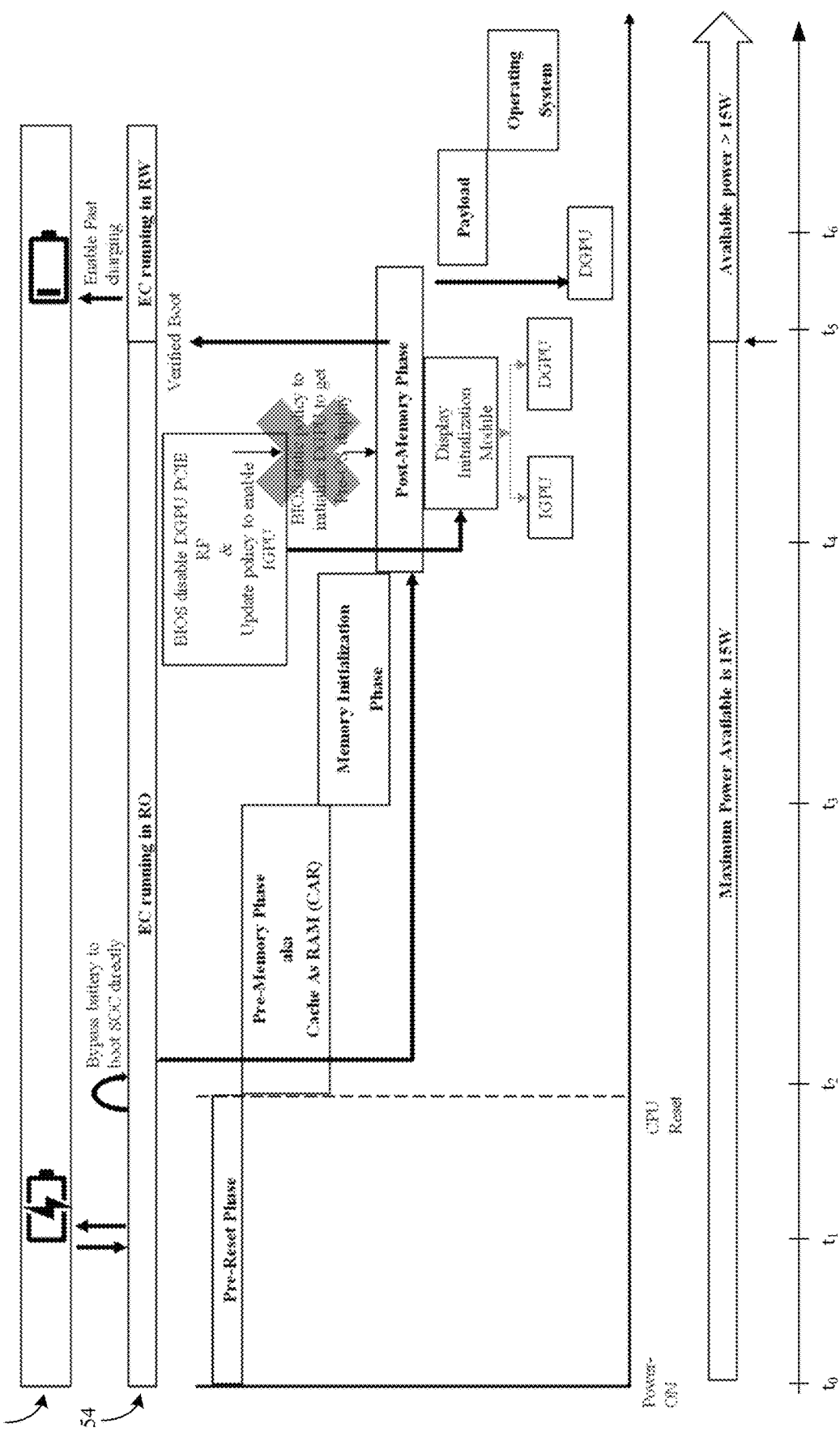
FIG. 2 is an illustration of an example of a boot timeline according to an embodiment.

FIG. 2 shows a boot timeline 50 for a computing system including a battery 52 and an EC 54. At time t0, the EC 54 reads the capacity of the battery 52 and at time $t_1$ the EC 54 determines that a low battery condition exists (e.g., fuel gauge buffer <4% and display battery <1%). At time $t_2$, the EC bypasses the battery 52 and supplies power directly to the SoC. At time $t_3$, the EC 54 communicates with the BIOS to provide notice of the battery state and the availability of a limited amount of power (e.g., 15 Watts). At time $t_4$, the BIOS disables the discrete root port and updates the dynamic boot policy to enable the integrated display. Of particular note is that a BIOS static policy and initialization of the external display may be overridden. A verified boot is available at time $t_5$, where the discrete root port is enabled at time $t_6$.

Figure 3:
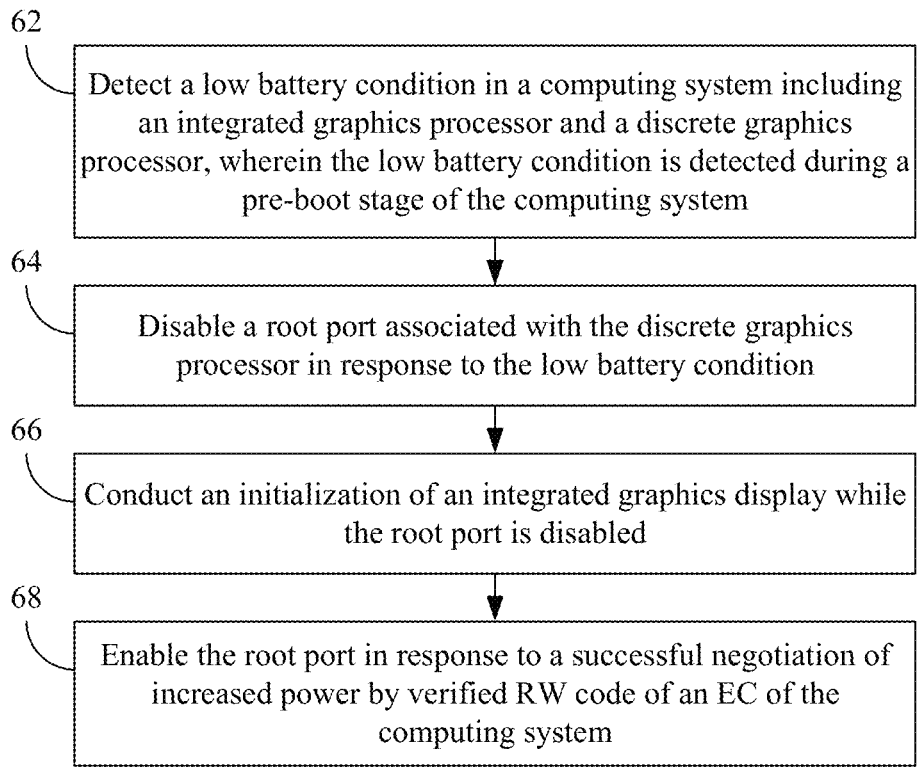
FIG. 3 is a flowchart of an example of a method of operating a performance-enhanced computing platform according to an embodiment.

FIG. 3 shows a method 60 of operating a performance-enhanced computing system. The method 60 may generally be implemented in a computing system and/or platform such as, for example, the computing system 10 (FIG. 1), already discussed. More particularly, the method 60 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 60 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 62 provides for detecting a low battery condition in a computing system including an integrated graphics processor and a discrete graphics processor, wherein the low battery condition is detected during a pre-boot stage of the computing system. In an embodiment, block 64 disables a root port associated with the discrete graphics processor in response to the low battery condition. Block 64 may also include setting a critical battery flag in response to the low battery condition, where the critical battery flag is set in a memory region that is shared by an embedded controller and a BIOS of the computing system. In such a case, the critical battery flag may trigger a supply of power from a charger to an SoC of the computing system, where the supply of power bypasses a battery of the computing system while the root port is disabled.

Illustrated block 66 conducts an initialization of an integrated graphics display while the root port is disabled. In one example, block 66 bypasses an initialization of an external display coupled to the root port while the root port is disabled. In an embodiment, block 68 enables the root port in response to a successful negotiation of increased power by verified RW code of the EC. Block 68 may also increase a charging rate of the computing system in response to the successful negotiation of increased power. The illustrated method 60 therefore enhances performance at least to the extent that system hangs and/or reboots are eliminated, faster charging is achieved and/or the user experience is improved.

Figure 4:
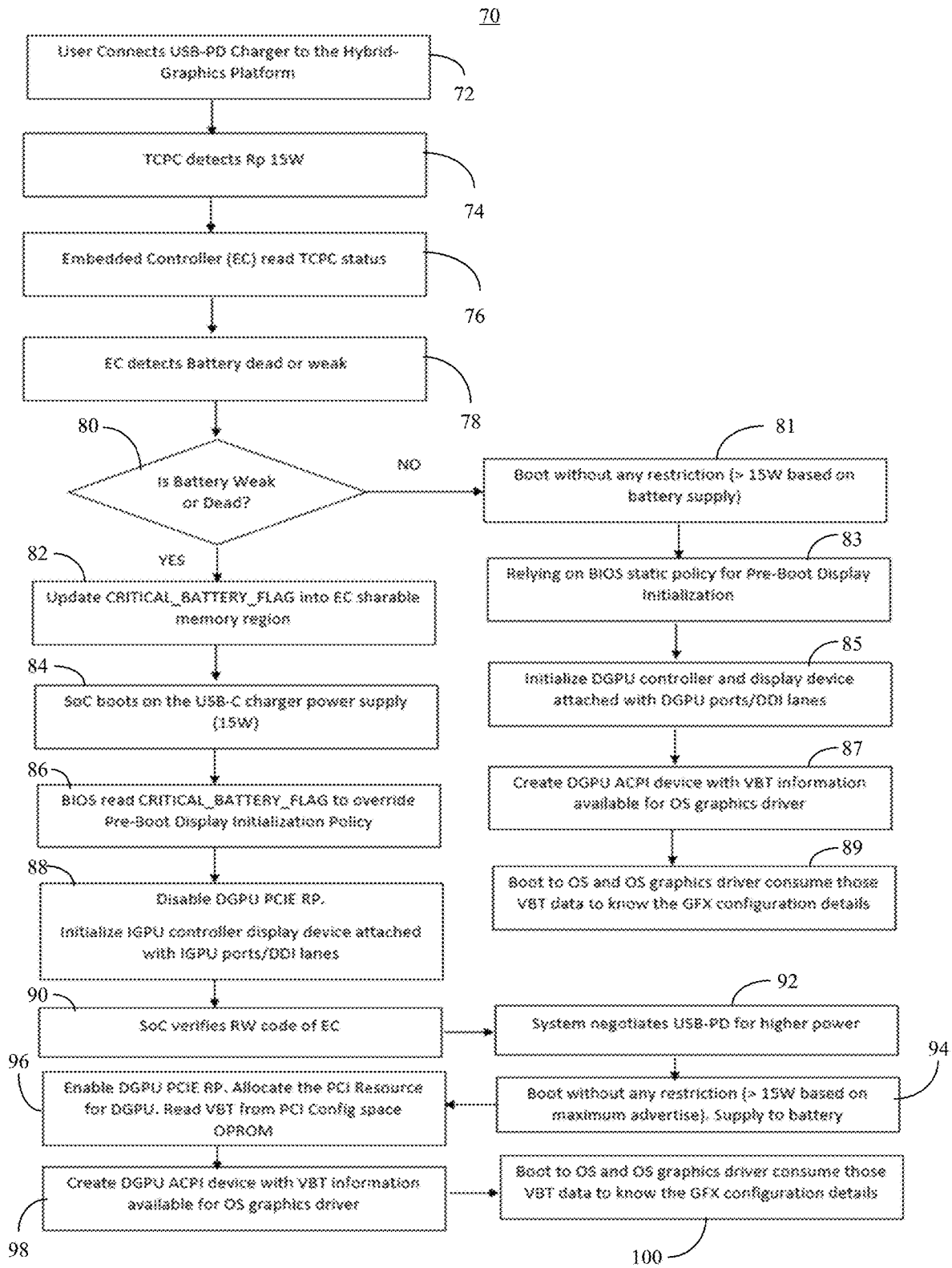
FIG. 4 is a flowchart of an example of a more detailed method of operating a performance-enhanced computing platform according to an embodiment.

FIG. 4 shows a more detailed method 70 of operating a performance-enhanced computing system. The method 70 may generally be implemented in a computing system and/or platform such as, for example, the computing system 10 (FIG. 1), already discussed. More particularly, the method 70 be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 72 may detect that a user has connected a USB-PD charger to a hybrid graphics platform, where a TYPE-C Port Controller (TCPC) detects an available power $R_p$ of 15 Watts at block 74. In one example, the EC reads the TCPC status at block 76 and searches for a weak or dead battery indication at block 78. A determination may be made at block 80 as to whether the battery is weak or dead. If the battery is weak or dead, block 82 updates a CRITICAL_BATTERY_FLAG in an EC sharable memory region. Additionally, the SoC may boot on the USB-C charger power supply (e.g., 15 Watts) at block 84. In an embodiment, BIOS reads the CRITICAL_BATTERY_FLAG at block 86 to override the pre-boot display initialization policy.

Accordingly, block 88 may disable the discrete graphics processing unit (DGPU, e.g., discrete graphics processor) PCIE RP (root port). Additionally, block 88 may initialize the integrated GPU (IGPU, e.g., integrated graphics processor) controller display device attached with IGPU ports and/or device driver interface (DDI) lanes. In one example, the SoC verifies the RW code of the EC at block 90 and the system negotiates with the USB-PD for higher power at block 92. Additionally, block 94 boots without any restrictions (e.g., >15 Watts based on the maximum advertisement) and supplies power to the battery. Block 96 enables the DGPU PCIE RP, allocates PCI resources for the DGPU, and reads the VBT from a PCI configuration space OPROM. Illustrated block 98 creates a DGPU ACPI device with the VBT information that is available for the OS graphics driver. In an embodiment, block 100 boots to the OS and the OS graphics driver consumes the VBT data to determine the graphics (GFX) configuration details.

If it is determined at block 80 that the battery is not weak or dead, illustrated block 81 boots without any restrictions (e.g., >15 W based on battery supply) and block 83 relies on a BIOS static policy for pre-boot display initialization. Additionally, block 85 initializes the DGPU controller and display device attached with DGPU ports/DDI lanes. In an embodiment, block 87 creates a DGPU ACPI device with the VBT information available for the OS graphics driver. Moreover, block 89 may boot to OS, where the OS graphics driver consumes the VBT data to determine the GFX configuration details.

Figure 5:
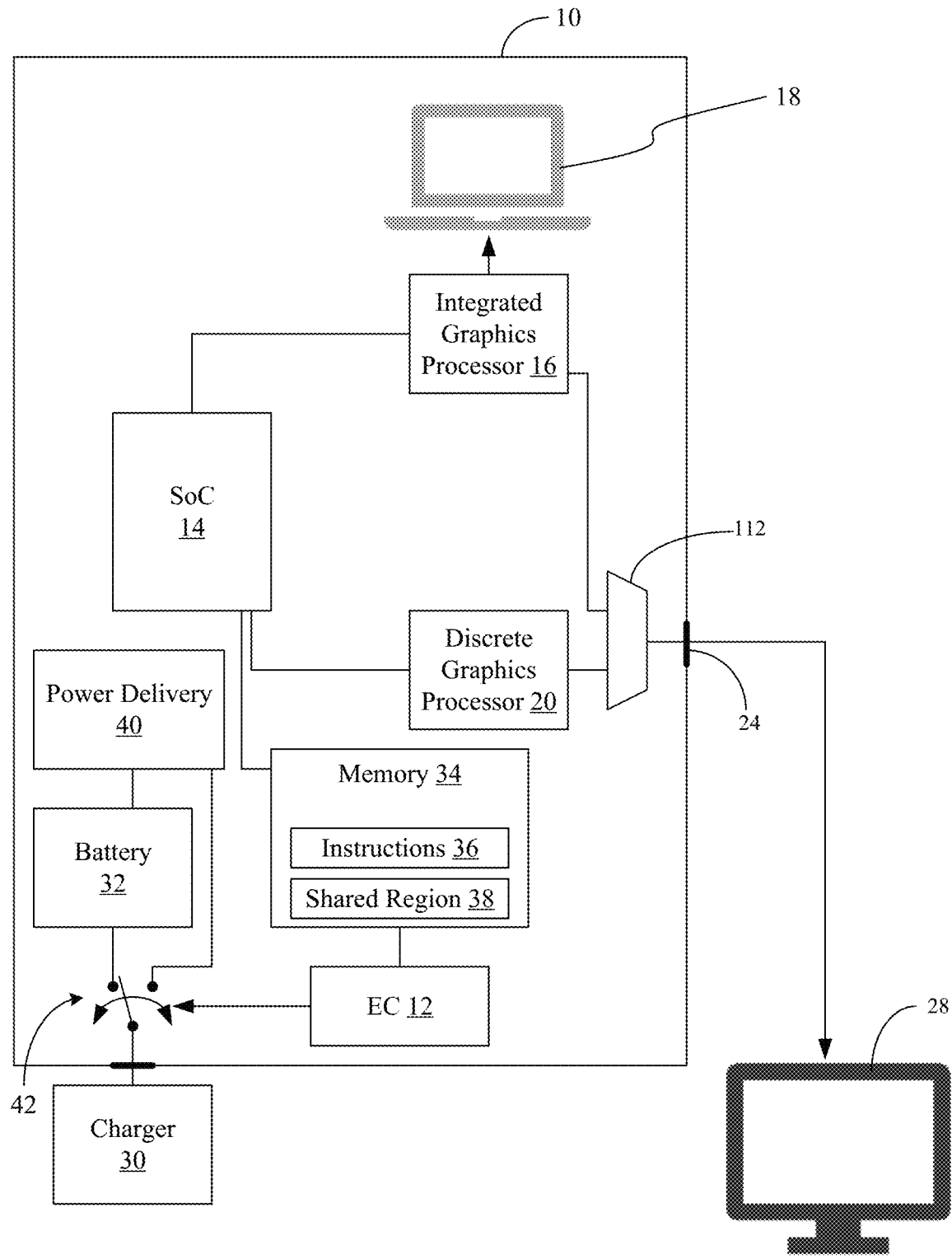
FIG. 5 is a block diagram of another example of a performance-enhanced computing platform according to an embodiment.

FIG. 5 shows a performance-enhanced computing system 110 having an additional hardware design to support the hybrid graphics technology described herein. In the illustrated example, a multiplexer (MUX) 112 is placed between the discrete graphics processor 20 (e.g., DGPU) and the integrated graphics processor 16 (e.g., IGPU) to establish an alternative path for communication. In a critical battery case, the external display 28 may be accessed by the integrated graphics processor 16 for the purpose of programming memory mapped input output (MMIO) registers and displaying pre-OS information in a power efficient manner. The configuration flow for MUX 112 settings with the illustrated hardware design may involve controlling the MUX 112 to select discrete graphics processor 20 by default in a hybrid scenario. Once the system begins booting, BIOS may communicate with the EC 12 to determine the status of the platform (e.g., if booting with critical or dead battery use case).

If a low power platform boot use case is detected, the BIOS may control the MUX 112 programming to select the integrated display 18 (e.g., integrated graphics device/IGD). During this procedure, a general purpose input output (GPIO) select is switched to select the integrated display 18 in order to initialize the external display in power efficient manner to make use of lower power function blocks. The integrated display 18 MMIO resources (e.g., registers) may be used to output information over the integrated display 18 without using discrete graphics processor 20 resources. After negotiating into the higher power mode, the BIOS may keep the SoC 114 in the charging loop unless the user further presses power button to boot to the OS. While booting to the OS may read the PCI device to bind the external display 28, using a discrete graphics driver may ensure an improved visual experience.

Figure 6:
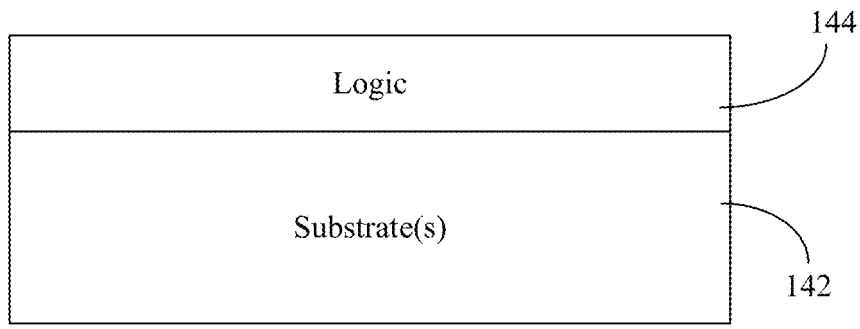
FIG. 6 is an illustration of an example of a semiconductor apparatus according to an embodiment.

FIG. 6 shows a semiconductor package apparatus 140. The illustrated apparatus 140 includes one or more substrates 142 (e.g., silicon, sapphire, gallium arsenide) and logic 144 (e.g., transistor array and other integrated circuit/IC components) coupled to the substrate(s) 142. The logic 144 may be implemented at least partly in configurable logic or fixed-functionality logic hardware. In one example, the logic 144 implements one or more aspects of the method 60 (FIG. 3) and/or the method 70 (FIG. 4), already discussed.

Thus, the logic 144 may detect a low battery condition in a computing system including an integrated graphics processor and a discrete graphics processor, wherein the low battery condition is detected during a pre-boot stage of the computing system. In an embodiment, the logic 144 also disables a root port associated with the discrete graphics processor in response to the low battery condition, conduct an initialization of an integrated display while the root port is disabled, and enable the root port in response to a successful negotiation of increased power by a verified read write code of an embedded controller of the computing system.

In one example, the logic 144 includes transistor channel regions that are positioned (e.g., embedded) within the substrate(s) 142. Thus, the interface between the logic 144 and the substrate(s) 142 may not be an abrupt junction. The logic 144 may also be considered to include an epitaxial layer that is grown on an initial wafer of the substrate(s) 142.

Figure 7:
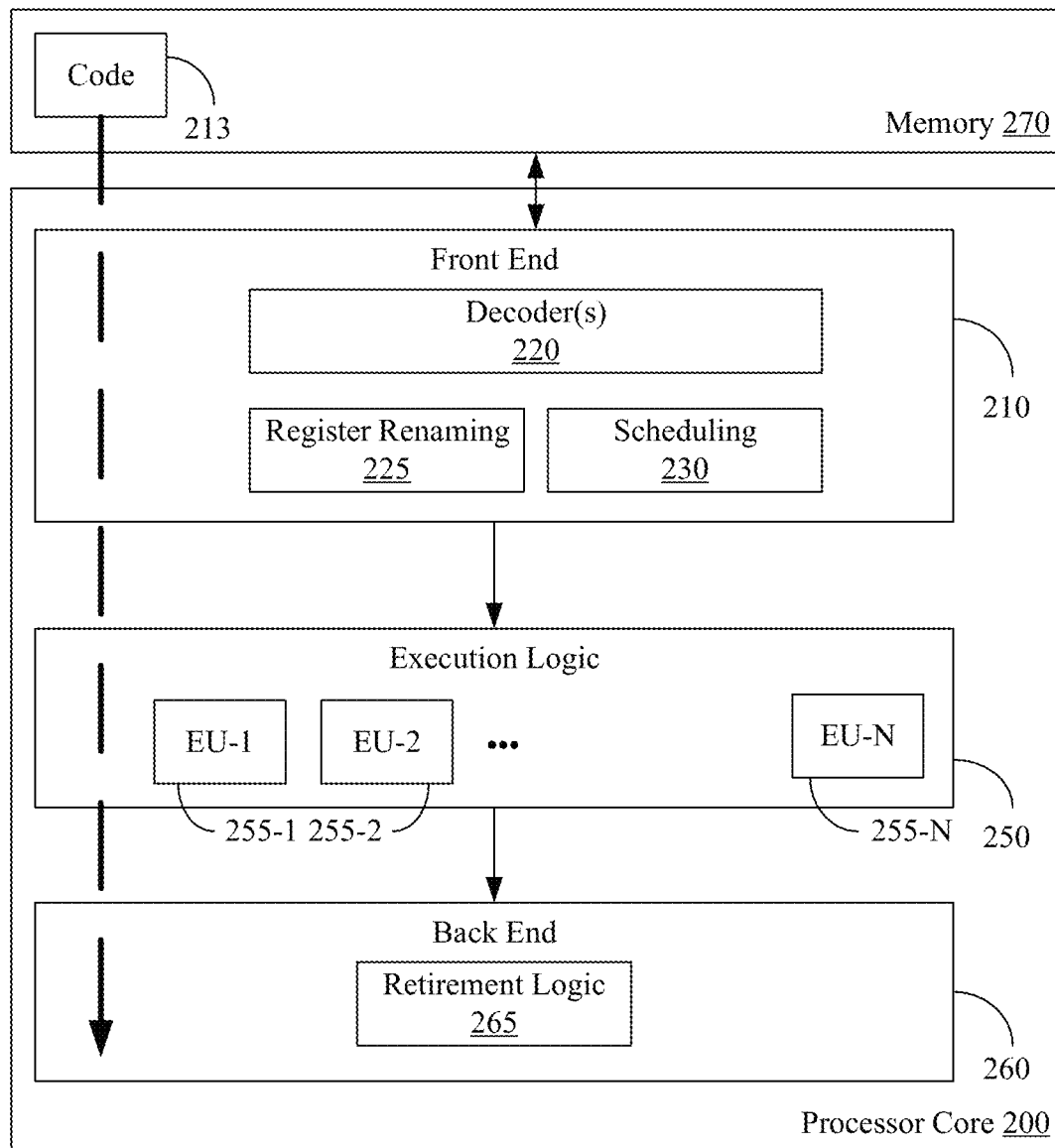
FIG. 7 is a block diagram of an example of a processor according to an embodiment.

FIG. 7 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 7, a processing element may alternatively include more than one of the processor core 200 illustrated in FIG. 7. The processor core 200 may be a single-threaded core or, for at least one embodiment, the processor core 200 may be multithreaded in that it may include more than one hardware thread context (or "logical processor") per core.

FIG. 7 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 60 (FIG. 3) and/or the method 70 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 7, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 8, shown is a block diagram of a computing system 1000 embodiment in accordance with an embodiment. Shown in FIG. 8 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 8 may be implemented as a multi-drop bus rather than point-to-point interconnect.

As shown in FIG. 8, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 7.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 8, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 8, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of the method 60 (FIG. 3) and/or the method 70 (FIG. 4), already discussed. Further, an audio I/O 1024 may be coupled to second bus 1020 and a battery 1010 may supply power to the computing system 1000.

Note that other embodiments are contemplated. For example, instead of the point-to-point architecture of FIG. 8, a system may implement a multi-drop bus or another such communication topology. Also, the elements of FIG. 8 may alternatively be partitioned using more or fewer integrated chips than shown in FIG. 8.

ADDITIONAL NOTES AND EXAMPLE

Example 1 includes a performance-enhanced computing system comprising an embedded controller (EC), a system on chip (SoC), an integrated graphics processor, an integrated display coupled to the integrated graphics processor, a discrete graphics processor, a root port coupled to the discrete graphics processor, and memory including a set of executable program instructions, which when executed by the SoC, cause the SoC to detect a low battery condition in the computing system during a pre-boot stage of the computing system, disable the root port in response to the low battery condition, conduct an initialization of the integrated display while the root port is disabled, and enable the root port in response to a successful negotiation of increased power by a verified read write code of the EC.

Example 2 includes the computing system of Example 1, wherein the instructions, when executed, further cause the SoC to bypass an initialization of an external display coupled to the root port while the root port is disabled.

Example 3 includes the computing system of Example 2, wherein the instructions, when executed, further cause the computing system to conduct the initialization of the external display after the root port is enabled, and wherein the initialization of the external display is conducted based on a video basic input output system table.

Example 4 includes the computing system of Example 1, wherein the instructions, when executed, further cause the computing system to set a critical battery flag in response to the low battery condition, and wherein the critical battery flag is set in a memory region that is shared by the EC and a basic input output system of the computing system.

Example 5 includes the computing system of Example 4, wherein the critical battery flag is to trigger a supply of power from a charger to the SoC, and wherein the supply of power is to bypass a battery of the computing system while the root port is disabled.

Example 6 includes the computing system of any one of Examples 1 to 5, wherein the instructions, when executed, further cause the computing system to increase a charging rate of the computing system in response to the successful negotiation of increased power.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to detect a low battery condition in a computing system including an integrated graphics processor and a discrete graphics processor, wherein the low battery condition is detected during a pre-boot stage of the computing system, disable a root port associated with the discrete graphics processor in response to the low battery condition, conduct an initialization of an integrated display while the root port is disabled, and enable the root port in response to a successful negotiation of increased power by a verified read write code of an embedded controller of the computing system.

Example 8 includes the semiconductor apparatus of Example 7, wherein the logic coupled to the one or more substrates is to bypass an initialization of an external display coupled to the root port while the root port is disabled.

Example 9 includes the semiconductor apparatus of Example 8, wherein the logic coupled to the one or more substrates is to conduct the initialization of the external display after the root port is enabled, and wherein the initialization of the external display is conducted based on a video basic input output system table.

Example 10 includes the semiconductor apparatus of Example 7, wherein the logic coupled to the one or more substrates is to set a critical battery flag in response to the low battery condition, and wherein the critical battery flag is set in a memory region that is shared by the embedded controller and a basic input output system of the computing system.

Example 11 includes the semiconductor apparatus of Example 10, wherein the critical battery flag is to trigger a supply of power from a charger to a system on chip of the computing system, and wherein the supply of power is to bypass a battery of the computing system while the root port is disabled.

Example 12 includes the semiconductor apparatus of Example 7, wherein the logic coupled to the one or more substrates is to increase a charging rate of the computing system in response to the successful negotiation of increased power.

Example 13 includes the semiconductor apparatus of any one of Examples 7 to 12, wherein the logic coupled to the one or more substrates includes transistor channel regions that are positioned within the one or more substrates.

Example 14 includes at least one computer readable storage medium comprising a set of executable program instructions, which when executed by a computing system, cause the computing system to detect a low battery condition in the computing system, wherein the computing system includes an integrated graphics processor and a discrete graphics processor, and wherein the low battery condition is detected during a pre-boot stage of the computing system, disable a root port associated with the discrete graphics processor in response to the low battery condition, conduct an initialization of an integrated display while the root port is disabled, and enable the root port in response to a successful negotiation of increased power by a verified read write code of an embedded controller of the computing system.

Example 15 includes the at least one computer readable storage medium of Example 14, wherein the instructions, when executed, further cause the computing system to bypass an initialization of an external display coupled to the root port while the root port is disabled.

Example 16 includes the at least one computer readable storage medium of Example 15, wherein the instructions, when executed, further cause the computing system to conduct the initialization of the external display after the root port is enabled, and wherein the initialization of the external display is conducted based on a video basic input output system table.

Example 17 includes the at least one computer readable storage medium of Example 14, wherein the instructions, when executed, further cause the computing system to set a critical battery flag in response to the low battery condition, wherein the critical battery flag is set in a memory region that is shared by the embedded controller and a basic input output system of the computing system.

Example 18 includes the at least one computer readable storage medium of Example 17, wherein the critical battery flag is to trigger a supply of power from a charger to a system on chip of the computing system, and wherein the supply of power is to bypass a battery of the computing system while the root port is disabled.

Example 19 includes the at least one computer readable storage medium of any one of Examples 14 to 18, wherein the instructions, when executed, further cause the computing system to increase a charging rate of the computing system in response to the successful negotiation of increased power.

Example 20 includes a method comprising detecting a low battery condition in a computing system including an integrated graphics processor and a discrete graphics processor, wherein the low battery condition is detected during a pre-boot stage of the computing system, disabling a root port associated with the discrete graphics processor in response to the low battery condition, conducting an initialization of an integrated display while the root port is disabled, and enabling the root port in response to a successful negotiation of increased power by verified read write code of an embedded controller of the computing system.

Example 21 includes the method of Example 20, further including bypassing an initialization of an external display coupled to the root port while the root port is disabled.

Example 22 includes the method of Example 21, further including conducting the initialization of the external display after the root port is enabled, wherein the initialization of the external display is conducted based on a video basic input output system table.

Example 23 includes the method of Example 20, further including setting a critical battery flag in response to the low battery condition, wherein the critical battery flag is set in a memory region that is shared by the embedded controller and a basic input output system of the computing system.

Example 24 includes the method of Example 23, wherein the critical battery flag triggers a supply of power from a charger to a system on chip of the computing system, and wherein the supply of power bypasses a battery of the computing system while the root port is disabled.

Example 25 includes the method of any one of Examples 20 to 24, further including increasing a charging rate of the computing system in response to the successful negotiation of increased power.

Example 26 includes means for performing the method of any one of Examples 20 to 25.

The technology described herein therefore overcomes platform boot limitations by adhering to a dynamic display initialization based on platform boot state. The technology further enables a verified boot to switch to higher power to boot to OS with discrete graphics enabled. Thus, for a platform with a DGPU (e.g., minimum platform power envelope of 40 Watts) lower power display may be dynamically chosen to avoid overloading of the power supply and creating power surge issues. Additionally, power from the adapter may be used to charge the battery faster and boot to OS faster. Accordingly, a better user experience and proper usage of system resources is achieved.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD (solid state drive)/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
   an embedded controller (EC);
   a system on chip (SoC);
   an integrated graphics processor;
   an integrated display coupled to the integrated graphics processor;
   a discrete graphics processor;
   a root port coupled to the discrete graphics processor; and
   a memory including a set of executable program instructions, which when executed by the SoC, cause the SoC to:
   detect a low battery condition in the computing system during a pre-boot stage of the computing system,
   disable the root port in response to the low battery condition,
   conduct an initialization of the integrated display while the root port is disabled, and
   enable the root port in response to a successful negotiation of increased power by a verified read write code of the EC.

2. The computing system of claim 1, wherein the instructions, when executed, further cause the SoC to bypass an initialization of an external display coupled to the root port while the root port is disabled.

3. The computing system of claim 2, wherein the instructions, when executed, further cause the computing system to conduct the initialization of the external display after the root port is enabled, and wherein the initialization of the external display is conducted based on a video basic input output system table.

4. The computing system of claim 1, wherein the instructions, when executed, further cause the computing system to set a critical battery flag in response to the low battery condition, and wherein the critical battery flag is set in a memory region that is shared by the EC and a basic input output system of the computing system.

5. The computing system of claim 4, wherein the critical battery flag is to trigger a supply of power from a charger to the SoC, and wherein the supply of power is to bypass a battery of the computing system while the root port is disabled.

6. The computing system of claim 1, wherein the instructions, when executed, further cause the computing system to increase a charging rate of the computing system in response to the successful negotiation of increased power.

7. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
detect a low battery condition in a computing system including an integrated graphics processor and a discrete graphics processor, wherein the low battery condition is detected during a pre-boot stage of the computing system;
disable a root port associated with the discrete graphics processor in response to the low battery condition;
conduct an initialization of an integrated display while the root port is disabled; and
enable the root port in response to a successful negotiation of increased power by a verified read write code of an embedded controller of the computing system.

8. The semiconductor apparatus of claim 7, wherein the logic coupled to the one or more substrates is to bypass an initialization of an external display coupled to the root port while the root port is disabled.

9. The semiconductor apparatus of claim 8, wherein the logic coupled to the one or more substrates is to conduct the initialization of the external display after the root port is enabled, and wherein the initialization of the external display is conducted based on a video basic input output system table.

10. The semiconductor apparatus of claim 7, wherein the logic coupled to the one or more substrates is to set a critical battery flag in response to the low battery condition, and wherein the critical battery flag is set in a memory region that is shared by the embedded controller and a basic input output system of the computing system.

11. The semiconductor apparatus of claim 10, wherein the critical battery flag is to trigger a supply of power from a charger to a system on chip of the computing system, and wherein the supply of power is to bypass a battery of the computing system while the root port is disabled.

12. The semiconductor apparatus of claim 7, wherein the logic coupled to the one or more substrates is to increase a charging rate of the computing system in response to the successful negotiation of increased power.

13. The semiconductor apparatus of claim 7, wherein the logic coupled to the one or more substrates includes transistor channel regions that are positioned within the one or more substrates.

14. At least one non-transitory computer readable storage medium comprising a set of executable program instructions, which when executed by a computing system, cause the computing system to:
detect a low battery condition in the computing system, wherein the computing system includes an integrated graphics processor and a discrete graphics processor, and wherein the low battery condition is detected during a pre-boot stage of the computing system;
disable a root port associated with the discrete graphics processor in response to the low battery condition;
conduct an initialization of an integrated display while the root port is disabled; and enable the root part in response to a successful negotiation of increased power by a verified read write code of an embedded controller of the computing system.

15. The at least one non-transitory computer readable storage medium of claim 14, wherein the instructions, when executed, further cause the computing system to bypass an initialization of an external display coupled to the root port while the root port is disabled.

16. The at least one non-transitory computer readable storage medium of claim 15, wherein the instructions, when executed, further cause the computing system to conduct the initialization of the external display after the root port is enabled, and wherein the initialization of the external display is conducted based on a video basic input output system table.

17. The at least one non-transitory computer readable storage medium of claim 14, wherein the instructions, when executed, further cause the computing system to set a critical battery flag in response to the low battery condition, wherein the critical battery flag is set in a memory region that is shared by the embedded controller and a basic input output system of the computing system.

18. The at least one non-transitory computer readable storage medium of claim 17, wherein the critical battery flag is to trigger a supply of power from a charger to a system on chip of the computing system, and wherein the supply of power is to bypass a battery of the computing system while the root port is disabled.

19. The at least one non-transitory computer readable storage medium of claim 14, wherein the instructions, when executed, further cause the computing system to increase a charging rate of the computing system in response to the successful negotiation of increased power.

20. A method comprising:
detecting a low battery condition in a computing system including an integrated graphics processor and a discrete graphics processor, wherein the low battery condition is detected during a pre-boot stage of the computing system;
disabling a root port associated with the discrete graphics processor in response to the low battery condition;
conducting an initialization of an integrated display while the root port is disabled; and
enabling the root port in response to a successful negotiation of increased power by verified read write code of an embedded controller of the computing system.

21. The method of claim 20, further including bypassing an initialization of an external display coupled to the root port while the root port is disabled.

22. The method of claim 21, further including conducting the initialization of the external display after the root port is enabled, wherein the initialization of the external display is conducted based on a video basic input output system table.

23. The method of claim 20, further including setting a critical battery flag in response to the low battery condition, wherein the critical battery flag is set in a memory region that is shared by the embedded controller and a basic input output system of the computing system.

24. The method of claim 23, wherein the critical battery flag triggers a supply of power from a charger to a system on chip of the computing system, and wherein the supply of power bypasses a battery of the computing system while the root port is disabled.

25. The method of claim 20, further including increasing a charging rate of the computing system in response to the successful negotiation of increased power.

* * * * *